US012648585B2

(12) United States Patent
Li et al.

(10) Patent No.:　US 12,648,585 B2
(45) Date of Patent:　Jun. 9, 2026

(54) MULTI-HEATING 3D PRINTER AND 3D PRINTING METHOD

(71) Applicant: The Hong Kong University of Science and Technology, Hong Kong (CN)

(72) Inventors: Guijun Li, Hong Kong (CN); Kong Wai Lee, Hong Kong (CN); Yang Xu, Hong Kong (CN); Qiaoyaxiao Yuan, Hong Kong (CN); Cynthia Hsin-tsing Mu, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 346 days.

(21) Appl. No.: 18/465,753

(22) Filed: Sep. 12, 2023

(65) Prior Publication Data

US 2024/0122226 A1　Apr. 18, 2024

Related U.S. Application Data

(60) Provisional application No. 63/416,931, filed on Oct. 17, 2022.

(51) Int. Cl.
| | |
|---|---|
| *A23P 20/20* | (2016.01) |
| *A23L 5/10* | (2016.01) |
| *B33Y 10/00* | (2015.01) |
| *B33Y 30/00* | (2015.01) |

(Continued)

(52) U.S. Cl.
CPC ................. *A23P 20/20* (2016.08); *A23L 5/15* (2016.08); *B33Y 10/00* (2014.12); *B33Y 30/00* (2014.12); *H05B 3/0076* (2013.01); *A23P 2020/253* (2016.08)

(58) Field of Classification Search
CPC ................................ A23P 30/20; A23P 30/25
See application file for complete search history.

(56) References Cited

U.S. PATENT DOCUMENTS

| | | | |
|---|---|---|---|
| 10,959,570 B2 | 3/2021 | Garcia et al. | |
| 2016/0009029 A1* | 1/2016 | Cohen | ................... B29C 64/209 |
| | | | 264/250 |
| 2016/0135493 A1 | 5/2016 | Kuo et al. | |

(Continued)

FOREIGN PATENT DOCUMENTS

| | | |
|---|---|---|
| CN | 215224692 U | 12/2021 |
| ES | 2739028 B2 | 1/2020 |

(Continued)

OTHER PUBLICATIONS

Naseri et al, Electrothermal Performance of Heaters Based on Laser-Induced Graphene on Aramid Fabric, ACS Omega. Jan. 20, 2022;7(4):3746-3757. doi: 10.1021/acsomega.1c06572. eCollection Feb. 1, 2022.*

(Continued)

*Primary Examiner* — Yung-Sheng M Tsui
(74) *Attorney, Agent, or Firm* — Leydig, Voit & Mayer, Ltd.

(57) ABSTRACT

A 3D food printer includes a printer head including, an extrusion nozzle and a laser assembly with at least one laser, and a heated printing platform. The extrusion nozzle is configured to extrude food onto the printing platform, and each of the printing platform and the at least one laser are configured to heat food extruded onto the printing platform.

18 Claims, 14 Drawing Sheets

(51) Int. Cl.
    *H05B 3/00*         (2006.01)
    *A23P 20/25*      (2016.01)

(56)            References Cited

U.S. PATENT DOCUMENTS

| | | | |
|---|---|---|---|
| 2016/0338545 A1 | 11/2016 | Shah et al. | |
| 2017/0245682 A1* | 8/2017 | Gracia | A47J 37/0635 |
| 2017/0297109 A1 | 10/2017 | Gibson et al. | |
| 2018/0192686 A1* | 7/2018 | Shoseyov | A21C 11/163 |
| 2018/0338519 A1* | 11/2018 | Albert | B29C 64/209 |
| 2019/0110505 A1* | 4/2019 | Blutinger | A23P 30/20 |
| 2021/0094227 A1* | 4/2021 | Wigand | B33Y 10/00 |
| 2023/0038707 A1* | 2/2023 | Marya | B33Y 80/00 |
| 2024/0399663 A1* | 12/2024 | Tham | B33Y 10/00 |

FOREIGN PATENT DOCUMENTS

| | | | | |
|---|---|---|---|---|
| WO | WO-2017220334 A1 * | 12/2017 | | A23P 20/20 |
| WO | WO-2018046573 A1 * | 3/2018 | | B29C 64/277 |
| WO | WO-2023004144 A2 * | 1/2023 | | B29C 64/106 |

OTHER PUBLICATIONS

Aftab et al, Laser-Induced Graphene for Advanced Sensing: Comprehensive Review of Applications, ACS Sens. Sep. 27, 2024;9(9):4536-4554. doi: 10.1021/acssensors.4c01717. Epub Sep. 16, 2024.*

Attarin, Sharmin, et al., "Food Printing: Evolving Technologies, Challenges, Opportunities, and Best adoption Strategies", *Journal of International Technology and Information Management*, vol. 29, Issue 1, Article 2, 32 pages (2020).

Blutinger, Tsai J., et al., "Precision cooking for printed foods via multiwavelength lasers", *npj nature partner journals, Science of Food*, 5:24, pp. 1-9, (2021).

Blutinger, J.D., et al., "Characterization of dough baked via blue laser," *Journal of Food Engineering*, 232, pp. 56-64, (2018).

Blutinger, J.D., et al., "Characterization of $CO_2$ laser browning of dough," *Innovative Food Science & Emerging Technologies*, 52. pp. 145-157, (2019).

* cited by examiner

100

110
108

102

104

112
106

102

112

110

106

112

110

106

102

600

WIRELESS COMMUNICATION UNIT

1016

WIRELESS COMMUNICATION UNIT

1014

MOBILE APP INTERFACE

1018

ACTUATORS

1004

CONTROLLER

1002

JOULE HEATER

1008

PRINTING HEAD UNIT     1003

LIG HEATER

1012

MULTI-LASER SYSTEM

1010

MICROFLUIDIC CHANNELS

1020

EXTRUSION NOZZLE

1006

1000

1114

1108

1106

1112

1110

1104

1102

1100

MULTI-HEATING 3D PRINTER AND 3D PRINTING METHOD

CROSS-REFERENCE TO RELATED APPLICATIONS

This patent application claims the benefit of U.S. Provisional Patent Application No. 63/416,931, filed on Oct. 17, 2022, which is hereby incorporated by reference.

BACKGROUND

With the development of 3D food printing, various types of edible material can be fabricated via an extrusion-based 3D printer. While multiple types of food ranging from dough, vegetable, fruit, meat, and others can be modified into a printable food ink through layer-by-layer additive manufacturing techniques at room temperature, some food types must be post-processed to be consumed or to prolong their shelf life via heating and/or drying. It is also important to ensure the printed food retains its intended printing shape and does not collapse or expand after being printed due to post-processing and/or thermal treatment. However, conventional heating and cooking methods like oven baking and air-frying must be carried out only after a 3D printing process has been completed, which in turns consumes additional time and energy. This imposes a challenge in terms of delivering ready-to-consume foods efficiently using 3D printing.

There is also a potential risk of microbial contamination during the food printing process, as raw printed food may be exposed to air for a long period of time. Conventional cooking methods are also not suitable for cooking thin layers of 3D printed food due to heating mechanisms that often deliver penetrating heat from the bottom of a printed food upwards. Conventional systems and methods may easily burn the bottom thin layer of the 3D printed food while being unable to cook the upper layers of the 3D printed food. This may cause cooked food objects to expand and thus affect the final textural and sensory properties of the 3D printed food. Furthermore, the key advantage of 3D food printing is that it offers a new way to fabricate personalized nutrition to suit individual needs, as different types of edible material can be mixed and extruded into an integrated food object. Since each printed food object could be different in terms of the edible material composition, cooking time and heating parameter requirements may vary. However, it is not possible to alternate various cooking parameters according to each food type within an integrated food object with conventional cooking and heating methods.

Conventional 3D printed food cooking methods are also deficient in that it is either too challenging or impossible to adjust cooking parameters such as heating power, temperature, and a selective cooking area of a printed food. In view of the above, conventional cooking methods are thus energy inefficient and provide minimal control over a cooking process, often requiring separate and/or isolated units and systems that take up space and lengthen overall food preparation and cooking times. Conventional methods and systems that use laser-based cooking are also time-consuming and inefficient, as the laser is unable to heat more than a small and precise portion of food at a time, leading to foods being easily burned and unevenly cooked.

A device and method for simultaneously printing and cooking food is therefore needed to ensure that 3D printed foods meet safety and quality objectives and/or standards. Moreover, a device and method for simultaneous printing and cooking of food is needed which enables fast and effective 3D printing of food, as conventional food printing techniques and devices are challenged in terms of speed.

SUMMARY

In an example embodiment, the present disclosure provides a 3D food printer comprising a printer head including an extrusion nozzle and a laser assembly with at least one laser, and a heated printing platform. The extrusion nozzle is configured to extrude food onto the printing platform, and each of the printing platform and the at least one laser are configured to heat food extruded onto the printing platform.

In a further example embodiment, the printer head further includes an infrared heater, and wherein the infrared heater is configured to heat food extruded onto the printing platform.

In a further example embodiment, the infrared heater includes a plurality of laser-induced graphene heaters.

In a further example embodiment, the plurality of laser-induced graphene heaters are arranged evenly distributed above the extrusion nozzle in a fixed position relative to the extrusion nozzle and at an angle relative to the printing platform.

In a further example embodiment, the laser-induced graphene heaters are configured to evenly heat an upper surface of food extruded onto the printing platform.

In a further example embodiment, the 3D food printer further comprises a controller in communication with a wireless receiver. The controller is configured to control a heating operation of each of the extrusion nozzle, the laser assembly, the infrared heater, and the printing platform based on instructions received by the wireless receiver.

In a further example embodiment, the controller is configured to receive cooking parameters, including a food textural property and a nutrition property, and the controller is configured to control a heating operation of each of the extrusion nozzle, the laser assembly, the infrared heater, and the printing platform based on the received cooking parameters.

In a further example embodiment, the controller is configured to receive a food type, and the controller is configured to control a heating operation of each of the extrusion nozzle, the laser assembly, the infrared heater, and the printing platform based on the received food type.

In a further example embodiment, each of the printing platform, the at least one laser, and the infrared heater are configured to heat food extruded onto the printing platform, and the extrusion nozzle is configured to extrude food simultaneously with heating of the food extruded onto the printing platform.

In a further example embodiment, the printing platform includes a Joule heater configured to heat the food extruded onto the printing platform by the extrusion nozzle until a 3D food printing process is completed.

In a further example embodiment, the Joule heater is configured to reach a temperature of at least 140 degrees Celsius within 90 seconds of receiving power.

In a further example embodiment, the laser assembly includes three lasers, including an infrared laser, a 405 nm laser, and a 450 nm laser, and wherein one of the three lasers may be selectively powered on at any given time to heat food extruded onto the printing platform.

In another example embodiment, the present disclosure provides a 3D food printer comprising a printer head including an extrusion nozzle and an infrared heater, and a heated printing platform. The extrusion nozzle is configured to extrude food onto the printing platform, and each of the printing platform and the infrared heater are configured to heat food extruded onto the printing platform.

In yet another example embodiment, the present disclosure provides a method for 3D printing food. The method includes: extruding food onto a printing platform via an extrusion nozzle; and simultaneously heating food extruded onto the printing platform with: a Joule heater embedded in the printing platform, at least one laser included in a laser assembly, and an infrared heater.

In a further example embodiment, the method further comprises moving the extrusion nozzle to deposit a plurality of food layers onto the printing platform, the laser assembly and the infrared heater being configured to move together with the extrusion nozzle.

In a further example embodiment, the method further comprises: receiving one or more of cooking parameters and a food type, the cooking parameters including a food textural property and a nutrition property; and controlling a heating operation of the laser assembly and the infrared heater to cook food extruded onto the printing platform based on the received cooking parameters and/or food type.

In a further example embodiment, the method further comprises: generating a recipe using artificial intelligence based on the received cooking parameters and/or one or more answers provided by a user to one or more questions; and determining a dosage of nutrients to be extruded in each layer of a 3D printed food.

In a further example embodiment, controlling the heating operation of the laser assembly includes actuating and/or selectively powering one of a plurality of lasers depending on the received cooking parameters.

In a further example embodiment, the laser assembly includes an infrared laser, a 405 nm laser, and a 450 nm laser.

In a further example embodiment, the infrared heater includes a plurality of laser-induced graphene heaters.

DETAILED DESCRIPTION OF THE INVENTION

Figure 1:
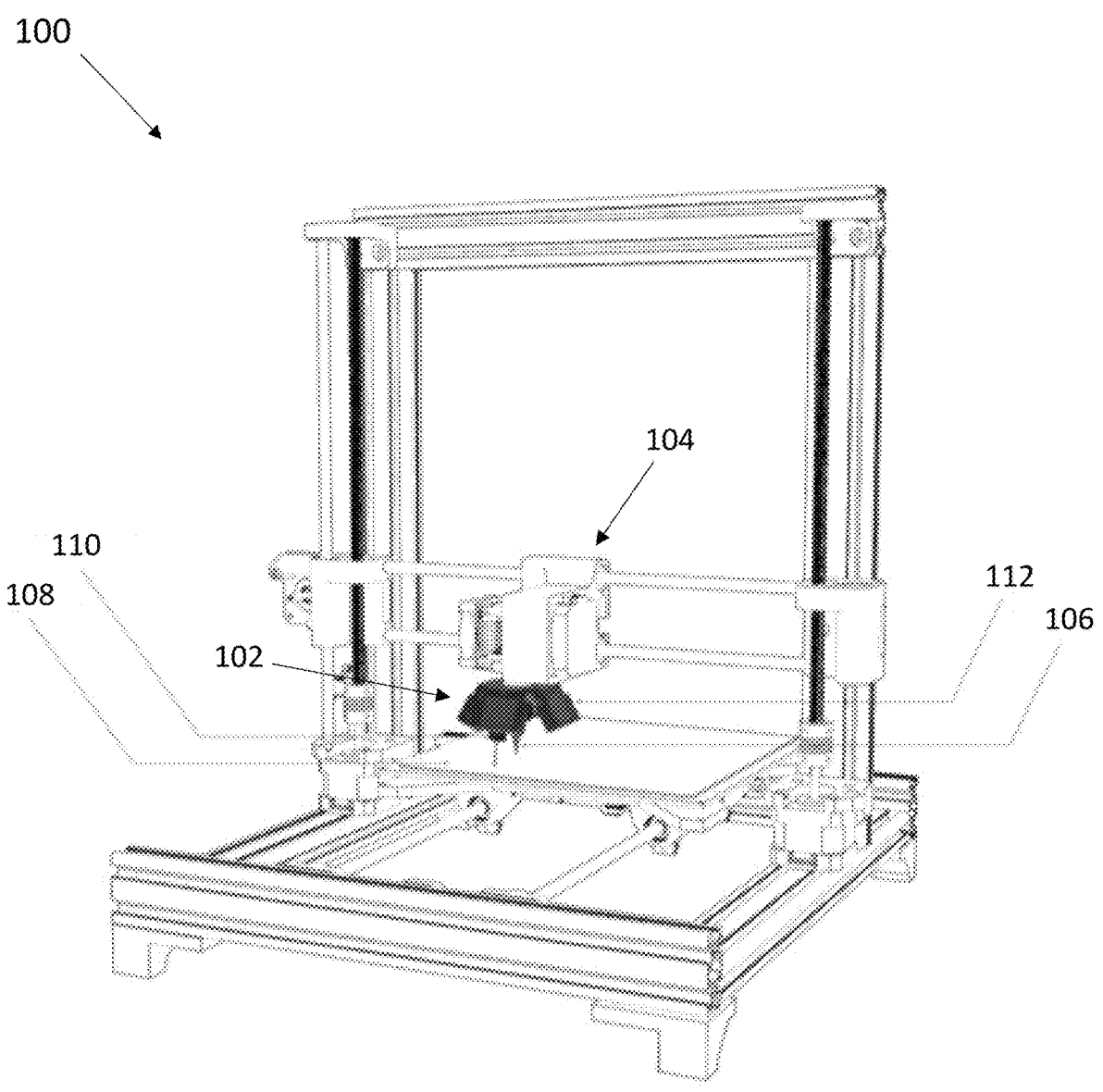
FIG. 1 illustrates a perspective view of a 3D food printer according to an embodiment with a multi-heating combination print head and a heated printing platform.

In an embodiment, a multi-heating combination method is provided, which includes ohmic heating, laser heating, and infrared heating to deliver simultaneous cooking during a 3D food printing process. The multi-heating combination method includes three types of heating sources that are embedded in a heating platform and print head system of a modified Cartesian 3D printer. A system according to an embodiment of the present disclosure comprises a food-safe Joule heating platform, a contactless top-down infrared heater, and a laser system containing three types of lasers with different wavelength outputs to control the cooking parameters of the food being 3D printed. The heating system may include a user-friendly mobile interface that displays and allows a user to browse a recipe library of foods available for printing and cooking via the system. The mobile interface is displayed as part of a mobile application, such as an application that may be stored and used on a smartphone, tablet, or other portable electronic device. The mobile application may be connected to the 3D printer via an Internet of Things (IoT) module, thereby allowing users to pre-select desired cooking methods, monitor a cooking process, and/or adjust cooking parameters manually at any instant or throughout any portion of time in the 3D printing process.

According to an embodiment, different heating parameters, such as heating power, heating speed, heating temperature, heating time, heating distance, diameter of a heat source, and a particular heating method, can be adjusted and calculated based on printed food type and desired cooking outcome. Nutrient loss can also be avoided or reduced due to decreased heating times and increased overall cooking efficiency compared with conventional cooking and heating methods, such as oven baking, air-frying, and microwaving. For example, sensitive nutrients such as vitamins and nutrients used in Traditional Chinese Medicine (TCM) can be treated using lower heating temperatures and/or shorter heating times in order to preserve active substances contained therein. In contrast, foods which require heating that results in a crispy texture, such as cookie dough, may be cooked using higher heating power. Different heating parameters may be obtained experimentally through heating tests on individual food ingredients, and may subsequently be stored in local memory or a remote database so as to be accessible by systems and devices according to embodiments of the present disclosure.

In an embodiment, a multi-heating combination method is provided in which one of a plurality of food heating sources is a base Joule heater embedded on or in a printing platform to form a heating bed. The embedded Joule heater carries out direct heating of food with which it is in contact by generating heat through electrical resistance. The embedded Joule heater prevents surface fouling and overheating of food, and keeps printed food dry and sterilized. The heat bed is configured to heat a base layer of food on the printing platform with ultrafast speed to a sterilization temperature of up to 140° C. in less than 90 seconds. This represents a significant advantage over conventional heating methods, which may take several minutes to heat up sufficiently. Joule heaters also have a lower maintenance cost in comparison to conventional heaters, making them a more environmentally friendly heater that delivers excellent thermal performance.

Heating via the Joule heater is carried out continuously during a 3D printing process to keep printed food at an optimum warmth without causing overheating due to a high energy conversion efficiency. Heating of printed food via the Joule heater also minimizes the temperature difference between each printed layer of food throughout the 3D food printing process, which in turn minimizes the risk of microbial pathogens populating the printed food. The disclosed heat bed comprising a Joule heater also advantageously does not require an enclosed environment in order to properly heat printed food, making the 3D printing process more enjoyable and observable for a user, and allowing for more direct manual manipulation and/or intervention when necessary. The heat bed also serves an important role in securing a solid foundation for building up of a 3D shape upwards during a 3D printing process.

Another of the plurality of food heating sources is a near-infrared heater configured in a focused three-dimensional shape comprising multiple thin laser-induced graphene (LIG) heating elements. Infrared (IR) technology is highly energy-efficient, less water consuming, and environmentally friendly compared to conventional heating. IR technology implemented in LIG heating elements according to embodiments of the present disclosure are optimized to deliver higher thermal emissivity compared to conventional infrared lamps. In particular, the LIG heating elements are flexible resistive heats fabricated from a copper-polyimide film that is coated with a thin layer of laser-induced graphene to increase emissivity while maintaining a smaller size in comparison with conventionally used IR lamps. The resistive heater provides quick responses to actuating electrical signals, while the LIG coating provides high emissivity that enhances thermal radiation towards a target surface of extruded food. The emissivity of the LIG coating is tuned by different laser scribing parameters and verified by Fourier transform infrared (FTIR) and ultraviolet-visible (also known as UV-VIS, UV/VIS, or UV/Vis) spectroscopy.

The LIG heating elements also advantageously provide for homogeneity of heating, as the shape and design of the heater are optimized to radiate and focus heat directly to extruded food without overheating other areas of previously extruded food. The LIG heating elements are also optimized in terms of dimensions, coating(s) used, and the distance between each heating element and food so that desired cooking performance can be achieved without contacting the food. The LIG heating elements also provide for a high heat transfer rate, low heating times, low energy consumption, improved product quality, and improved food safety outcomes by inhibiting the growth of microbes. The LIG heating elements are relatively small compared to rigid and bulky conventional infrared lamps and are designed as thin films, allowing them to be mounted on the print head system of the 3D printer and thereby maximize thermal performance. The LIG heating elements provide unique radiation properties that benefit the cooking of the thin layers of 3D printed food due to short penetration depth.

The LIG heating elements are arranged evenly in a three-dimensional configuration in a housing that is mounted on top of a 3D printer's extruder system. The LIG heater is configured to cook each thin layer of printed food uniformly during the 3D food printing process. Specifically, the three-dimensional configuration of the LIG heating elements enables uniform heating of the surface of each layer of printed food with a precise and evenly distributed cooking temperature. Because the LIG heating elements provide contactless heating with a top-down approach, each layer of printed food can be cooked thoroughly and rapidly before a subsequent layer of food is deposited via the 3D printing process. Precise cooking parameters for the 3D food printing process can be controlled by analyzing and targeting radiation absorption spectra according to each food type and its chemical structure. The radiation absorption spectra for individual ingredients and/or food type is obtained by devices capable of performing FTIR and/or UV/VIS spectroscopy. Absorption peaks for each individual ingredient and/or food type may then be identified using the obtained radiation absorption spectra. The absorption peak is indicative of a wavelength or region of wavelengths at which the ingredient and/or food type more readily absorbs radiation. Thus, the cooking of foods, according to the present disclosure may be optimized by manipulating the power delivered to the LIG heating elements based on identified absorption peaks to change how foods or ingredients within foods are cooked. For example, food objects with a high moisture content can be cooked and dried more rapidly with the LIG heating elements through the 3D printing process. The infrared radiation heater increases efficiency by targeting infrared radiation at the absorption peak of various food types in the infrared radiation range. The cooking parameters, radiation absorption spectra, and/or absorption peak(s) of individual ingredients and/or food types may be stored in memory so that it is accessible by a 3D printer and during a 3D printing process.

Another of the plurality of food heating sources is a multi-laser system with three types of lasers. Specifically, the multi-laser system includes an infrared laser, a 405 nm laser, and a 450 nm laser. The multi-laser system is mounted next to the 3D printer's nozzle and is used in combination with the LIG heating elements during the 3D printing process. Depending on the cooking requirements and desired textural properties of a particular food object, a particular laser in the multi-laser system can be selected for cooking. The infrared laser has the advantage of generating a crust-like and crispy texture of the printed food, while both the 405 nm laser and 450 nm laser are configured to cook the food while keeping it moist throughout the cooking process due to their unique wavelength emissions. Furthermore, the laser heating source has the advantage of being configured to focus a laser beam and achieve spot or localized cooking by only heating a very small spot on the printed food with high resolution. Such precision cooking enables selective heating of certain parts of the printed food and thus enables a 3D food printer to provide personalized textural, sensory, and nutrient properties to printed food. The multi-laser system eliminates the need to change a lens or other structure in order to change the wavelength of a laser used to heat food in a 3D printer, whereas conventional systems may require manual replacement or physical replacement via more complex and error-prone automatic systems. Furthermore, the multi-laser system incorporates multiple lasers in a compact manner such that they may be integrated into a printing head or on a separate structural unit that is compact, easy to clean, and easy to maintain.

In some embodiments, one of the lasers of the multi-laser system may be focused on freshly extruded portions of food, hence stabilizing a 3D printed food structure via thermal treatment to retain an intended design of a particular 3D food printing process. Cooking via lasers of the multi-laser system further advantageously provides for improved monochromaticity and directivity of a laser beam. During a cooking process, an appropriate laser wavelength can be selected based on the absorption and reflection spectra of a particular food type. Thus, the multi-laser system, according to embodiments of the present disclosure, provide for utilization of different wavelengths to achieve unique cooking effects based on a cooking requirement of each individual food type in a 3D printed food.

Embodiments of the present disclosure thus provide for 3D printing of food in such a manner that the food can be cooked, dried, and/or sterilized precisely, efficiently, and simultaneously during a 3D printing process. Embodiments of the present disclosure also provide for various heating methods which do not need to be carried out in an enclosed environment, enabling a user to intervene as necessary and/or to observe a 3D food printing process for greater involvement and enjoyment. Post-printing shape retention of 3D printed foods is improved due to decreased cooking times and increased cooking efficiency. Improved food sterilization capabilities prolong the shelf-life of 3D printed foods that are printed according to embodiments of the present disclosure. In an embodiment, an IoT or mobile interface also allows end-users full control of how food should be printed according to the user's preference. The necessity for separate and/or independent post-treatment of 3D printed foods can be avoided or eliminated, as foods that are personalized and can be consumed immediately after completion of a 3D printing process may be produced. The user's preference may include parameters such as the particular type of food to be printed, how the printed food should be cooked, to what degree the food should be cooked, textural properties of the food, sensory properties of the food, an aroma of the food, and nutrient content of the food. Such parameters can be adjusted by the user in the IoT or mobile interface, and the devices and methods according to embodiments of the present disclosure may then be utilized to adjust and control the heating sources embedded within a 3D food printing system to carry out a personalized 3D printing and cooking process.

For example, the textural properties of a food may be changed by manipulating the heating temperature, heating time, and/or a particular heating method used to cook an extruded food. In a more specific and illustrative example, a 3D printed cookie may be cooked by utilizing the LIG heating elements to bring an overall dry and crispy texture to the surface of a food, while laser heating can make specific areas of the food harder, therefore resulting in a 3D printed cookie with various desirable textures. Similarly, the aroma of a food or even its color may be manipulated based on how a certain ingredient and/or food type is known to react to other cooking parameters and/or the particular heating method used. The nutrient content of the food may be adjusted using a plurality of syringes that combine different nutrient ingredients or compositions into a single food extrusion through the plurality of microfluidic channels, thereby ensuring that precisely calculated proportions of nutrients, oil, and water are combined in an extruded product.

Artificial intelligence may be used to compose recipes or adjust known recipes according to a user's inputs in the IoT, and may further provide for precise dosage of nutrients to be included in each layer of food extruded, either based on an even spread of nutrients throughout the volume of a printed food product, or by adjusting nutrient content throughout a printing process by targeting areas of a food product that should be more or less nutrient-dense than others. In an embodiment, a preference quiz and/or a series of questions may be presented to a user, and recipe generation may be carried out based on answers provided by the user to the questions and/or the preference quiz. Cooking parameters may also be adjusted to preserve nutrient contents, such as by avoiding heating temperatures or heating times that would result in breaking down nutrients or otherwise mitigating their effects for a consumer. The IoT or mobile interface is also configured to allow a user to track and monitor the 3D food printing process and cooking processes, thereby providing more precise control to the user of the printed food's properties.

Embodiments of the present disclosure also advantageously provide a modular multi-heating print head with improved installation versatility. Because various heating devices and methods are incorporated into a single printer head, devices according to embodiments of the present disclosure may be installed on existing 3D food printers. In some embodiments, the various heating devices may be separate and modular, so that individual heating devices may easily be maintained, repaired, and/or replaced. In some embodiments the various heating devices may be installed in a customized 3D food printer for optimal configuration to perform a fewer number of known 3D printing processes more efficiently.

Embodiments of the present disclosure enable enhanced food preparation that may be desirable in a number of fields and/or settings. For example, in a medical or health setting, the ability to produce personalized 3D printed foods may improve patient or customer outcomes by enabling more controlled nutritional intake for a patient or making nutritious food more enjoyable for consumption. Patients with strong food and/or taste preferences, including children or people with sensory conditions, benefit from being able to personalize foods or to receive personalized foods that are more desirable to them based on preference but still provide needed nutrition. In the sports industry, athletes with special needs can likewise benefit from the personalized 3D printing process disclosed herein. In the hospitality and food service industries, the benefit of personalized food production will be readily apparent. Accordingly, the advantageous food fabrication devices and techniques described herein are particularly advantageous in a variety of fields and settings in which customized and/or personalized food production is desirable.

In an embodiment, a non-enzymatic device is provided for food analysis. The non-enzymatic device may include an LIG-coated electrode that is configured to detect food content rapidly during a printing and/or cooking process. The LIG-coated electrode is fabricated with copper-based carbon and includes laser-treated carbon cloth electrochemical sensors for chemical compound detection. The LIG-coated electrode has a surface area that is attached to a portable electrochemical station, and which is configured to be exposed to an electrolyte solution containing one or more food samples. In some embodiments, the surface area is rectangular in shape and has a 1 cm by 2 cm area. It will be readily understood that varying shapes and sizes of the surface area may be implemented without departing from the spirit of the present disclosure. One or more additional electrodes may also be provided which serve as a reference electrode or counter electrode. In some embodiments, a silver/silver chloride (Ag/AgCl) reference electrode is provided. In some embodiments, a platinum plate may be provided as a counter electrode. By providing an electrical potential across the electrodes and through an electrolyte solution containing a food sample, an electrical current may be measured and used as the basis for acquiring graphical data on a local or remote processor, such as a controller of the printer, a nearby computer, a remote server, and/or a mobile device. Advantageously, real-time analysis may thus be achieved without relying on FTIR and/or UV-VIS spectroscopy. Furthermore, the real-time analysis may be provided in a stand-alone portable device or in a device integrated with a food printer.

FIG. 1 illustrates a perspective view of a 3D food printer 100 according to an embodiment of the present disclosure. The 3D food printer 100 includes a multi-heating combination print head 102 attached to a print head mount 104. The print head mount 104 is configured for translational movement in one of three axes of the 3D food printer 100. It will be readily appreciated that the 3D food printer 100 includes various mounts, structures, and actuators known in relation to conventional 3D food printers for facilitating the movement of 3D printing heads. Various actuators, such as stepper motors, are used in connection with gears and/or belts to effect the translational movement of the multi-heating combination print head 102 in each of two or three axes, thereby enabling precise positional and movement control of multi-heating combination print head 102. The multi-heating combination print head 102 includes an extruding nozzle 106 through which food is extruded onto a printing platform 108. In some embodiments, the multi-heating combination print head 102 is configured for movement in two axes, and the printing platform 108 is configured to be moved in a third axis, thereby facilitating the three-dimensional extrusion of food from the extrusion nozzle in a space occupied by the frame of the 3D food printer 100. In some embodiments, the printing platform 108 may be stationary, and the multi-heating combination print head 102 is configured to move in all three axes to carry out 3D printing onto the stationary platform 108. The printing platform 108 includes a Joule heater, as described above, for rapidly heating foods extruded from extrusion nozzle 106 onto the platform 108.

The multi-heating combination print head 102 also includes a multi-laser housing unit 110 and an LIG heater holder 112, according to the multi-laser and LIG heating systems described above. Because each of the multi-laser housing unit 110 and LIG heater holder 112 are included in an assembly together with the extrusion nozzle, heating of freshly extruded food can be carried out regardless of the position of the multi-heating combination print head 102, as the various forms of cooking heat will follow the extrusion nozzle 106 during the 3D food printing process.

Figure 2:
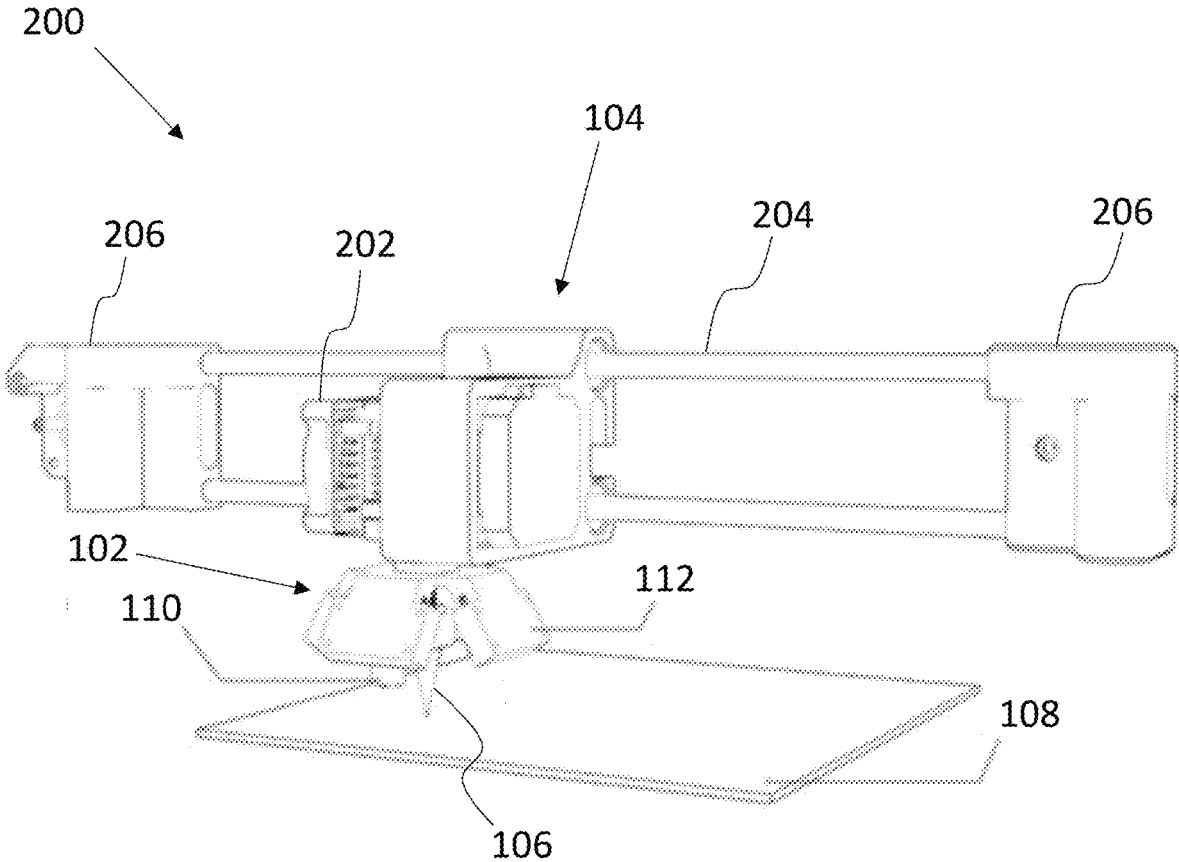
FIG. 2 illustrates a perspective view of the multi-heating combination print head of FIG. 1 mounted on a 3D printer axis.

FIG. 2 illustrates a perspective view of a partial assembly 200, including the multi-heating combination print head 102 of FIG. 1 mounted on a 3D printer axis. The print head mounts 104, and thus the multi-heating combination print head 102 attached to it, are configured to move along rails 204 in the direction of one axis of the 3D printer. Movement of the print head mount 104 in an axis orthogonal to the rails 204 is facilitated via worm gear mounts 206, which in the illustrated embodiment are configured to move the print head mount 104 up or down in the vertical direction. Movement of the print head mount 104 is effected by actuators such as stepper motor 202, which may be incorporated into the stationary frame of the 3D food printer or may be incorporated into a moving part, such as the print head mount 104.

Figure 3:
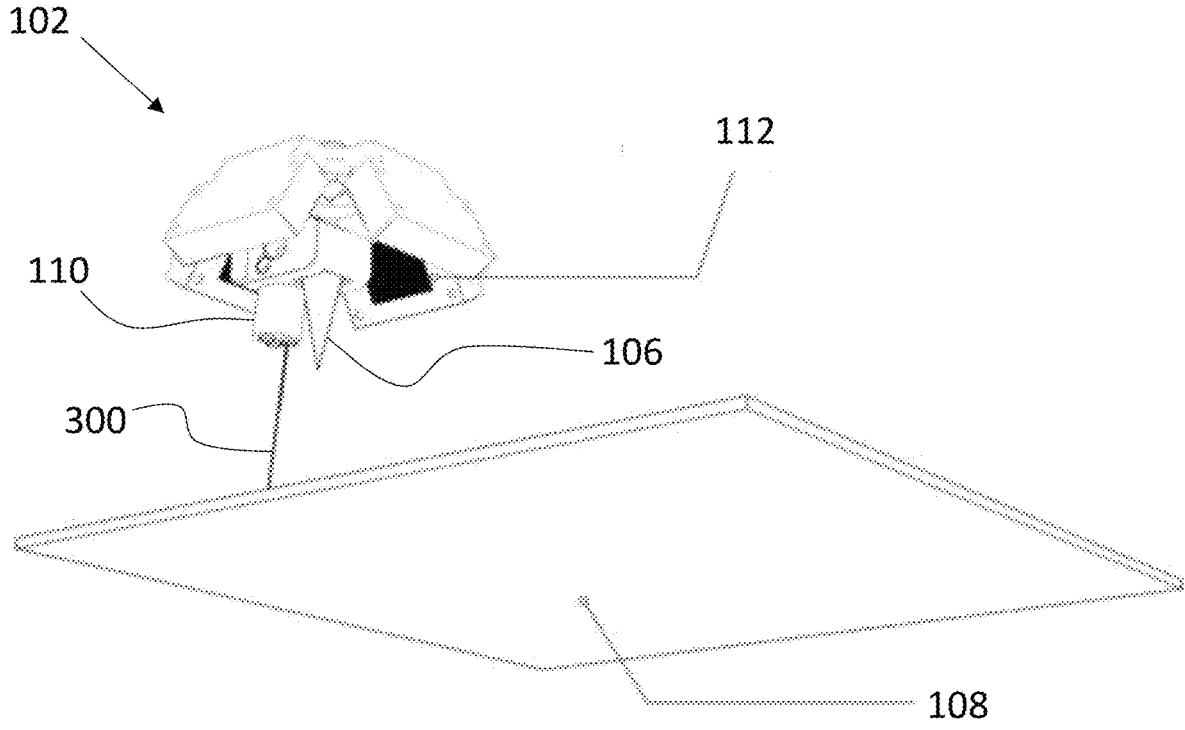
FIG. 3 illustrates a perspective view of the multi-heating combination print head and printing platform of FIG. 1.

FIG. 3 illustrates a perspective view of the multi-heating combination print head 102 and print platform 108 of FIG. 1. As shown in more detail in FIG. 3, the multi-laser housing unit 110 is configured to emit, via one of its plurality of lasers, a laser beam 300 toward the print platform 108. The laser beam 300 may be directed at a stationary position at or near an extrusion point at which food is extruded from the extrusion nozzle 106. In some embodiments, the laser is arranged to direct a laser beam 300 at an offset relative to the extrusion point. The multi-laser housing unit 110 may be configured such that a laser beam 300 may be controllably aimed at various positions relative to an extrusion point, thus enabling dynamic heating of one and or several specific parts of an extruded food simultaneously with extrusion. Although the illustrated embodiment includes three lasers within the multi-laser housing unit 110, some embodiments may include only one laser in order to reduce costs by providing only the hardware necessary for a smaller range of food items that a particular 3D food printer may be optimized to produce. In some embodiments, greater cooking versatility and capabilities may be achieved by the inclusion of more than three lasers having varying wavelengths.

Figure 4:
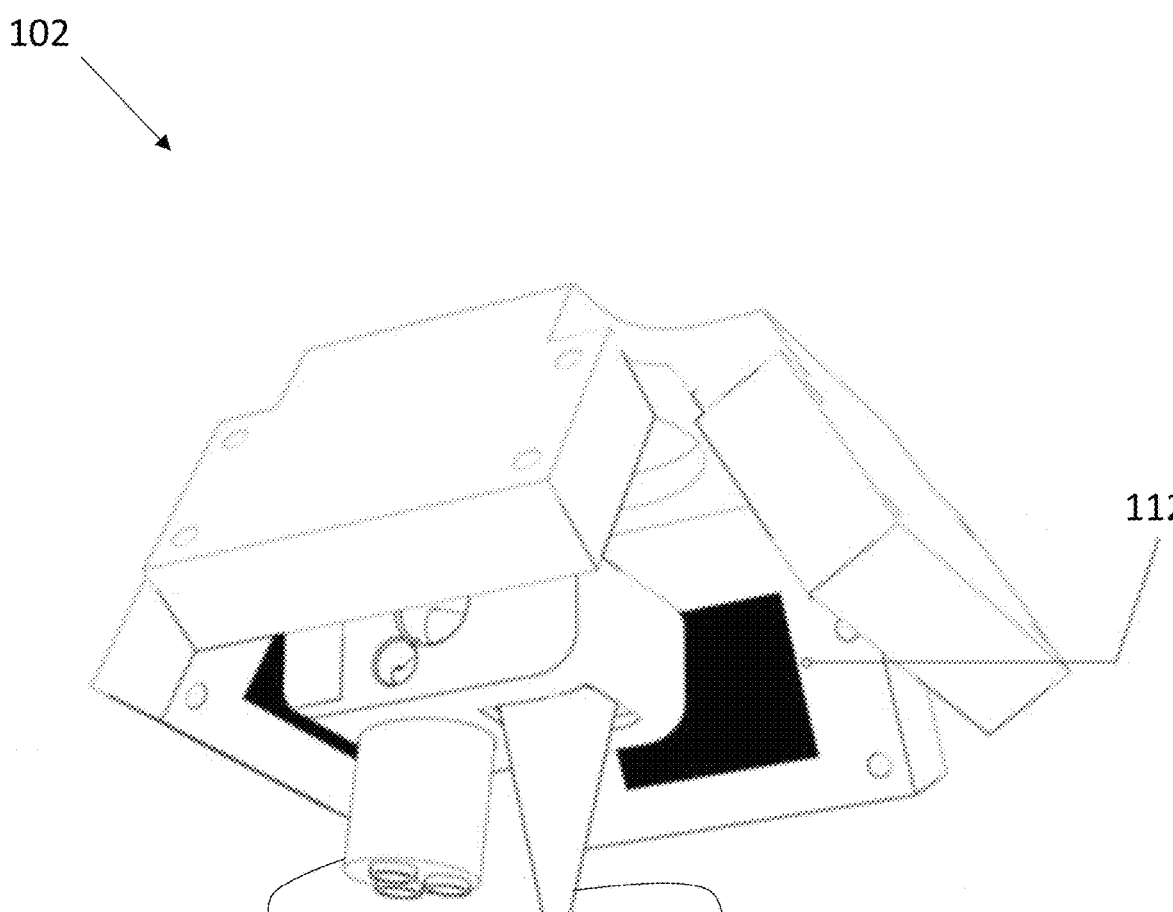
FIG. 4 illustrates a perspective view of the multi-heating combination print head of FIG. 1.

FIG. 4 illustrates a perspective view of the multi-heating combination print head 102 of FIG. 1 to show its features in greater detail. The multi-heating combination print head 102 includes an extrusion nozzle 106 directed toward a printing platform and away from the multi-heating combination print head 102. The multi-laser housing unit 110 may be arranged adjacent to the extrusion nozzle 106 for closer proximity to an extrusion point of the extrusion nozzle 106, thereby facilitating selective or continuous laser heating of food as it is extruded or after it has been extruded. In the illustrated embodiment, the multi-laser housing unit 110 includes at least three lasers within a cylindrical housing. The cylindrical housing may remain stationary and allow for selective powering of one of the lasers at a time, or the cylindrical housing may be configured to rotate, thereby allowing rotation of the different laser lenses into or out of the path of an emitter within the multi-heating combination print head 102. The cylindrical housing may be configured to move or rotate in other directions to facilitate directing a laser beam in various directions relative to an extrusion point of the extrusion nozzle 106.

The LIG heater holder 112 includes thin LIG films that may be arranged on or in one or more structures, aiming infrared waves from many directions toward the extrusion point. In the illustrated embodiment, the LIG heater holder 112 includes four structures to which LIG films are attached, the four structures being angled relative to an extrusion direction so as to form a dome and provide three-dimensional infrared coverage onto a surface of extruded food from above.

Figure 5:
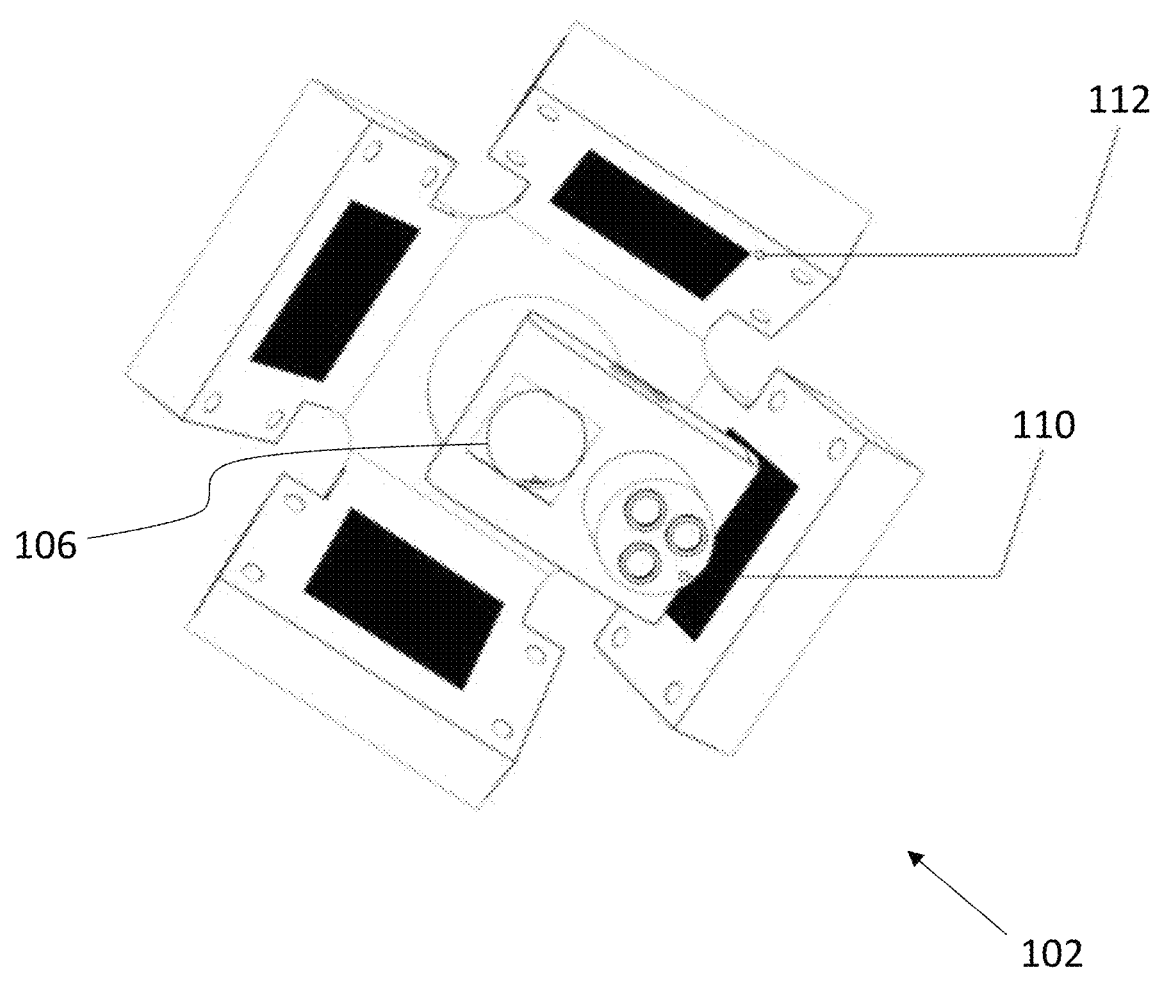
FIG. 5 illustrates an additional perspective view of the multi-heating combination print head of FIG. 1.

FIG. 5 illustrates an additional perspective view of the multi-heating combination print head 102 of FIG. 1. The multi-laser housing unit 110 and LIG heater holder 112 may be part of a unitary or permanent structure together with extrusion nozzle 106. In some embodiments, the multi-laser housing unit 110 and LIG heater holder 112 may be structurally separate from the extrusion nozzle 106 and its supportive structures. In such a configuration, the multi-laser housing unit 110 and LIG heater holder 112 may be selectively attached or detached from the extrusion nozzle 106 or multi-heating combination print head 102. This is advantageous in that the multi-laser housing unit 110 and LIG heater holder 112 may thus be configured to be attached to a conventional extrusion nozzle or print head, allowing the conversion of a more rudimentary 3D food printer into one which can perform the additional heating operations described herein and perform cooking and printing of food simultaneously.

Figure 6:
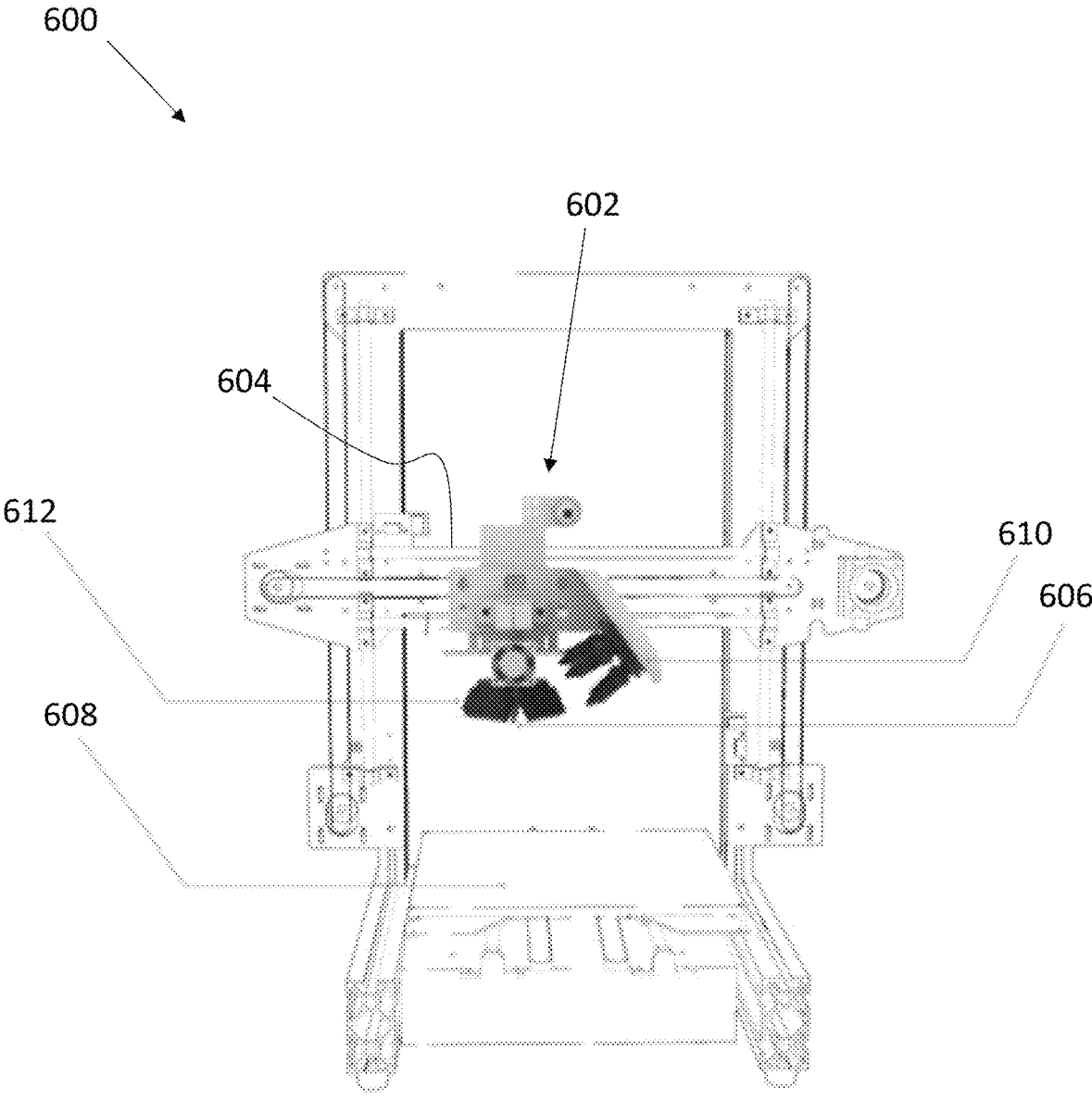
FIG. 6 illustrates a perspective view of a 3D food printer according to an embodiment with a multi-heating combination print head and a heated printing platform.

FIG. 6 illustrates a perspective view of a 3D food printer 600 according to an embodiment with a multi-heating combination print head 602 and a platform 608. Some general similarities relative to the 3D food printer 100 illustrated in FIG. 1 are illustrated and readily apparent. The multi-heating combination print head 602 is mounted either directly or indirectly via a mount to a rail 604, providing for movement of the multi-heating combination print head 602 in an axis. The multi-heating combination print head 102 includes an extrusion nozzle 606 directed toward the printing platform 608, a multi-laser housing unit 610, and an LIG heater holder 112.

Figure 7:
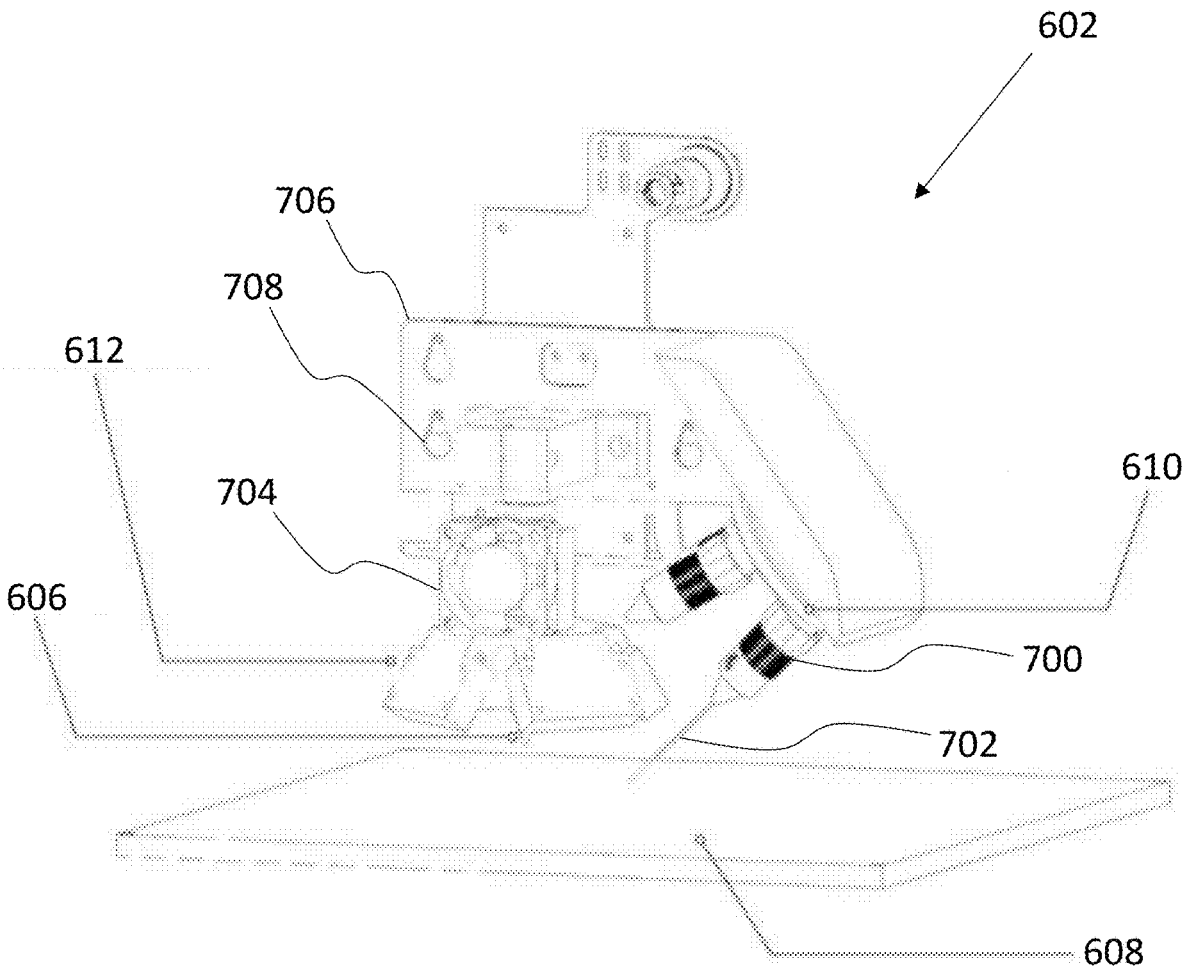
FIG. 7 illustrates a perspective view of the multi-heating combination print head and printing platform of FIG. 6.

FIG. 7 illustrates a closer perspective view of the multi-heating combination print head 602 and printing platform 608 of FIG. 6. In the illustrated embodiment, the multi-heating combination print head 602 includes a multi-laser housing unit 610 with a plurality of individual lasers 700. One of the plurality of individual lasers 700 may be powered to emit a laser beam 702 at a given time. It will be readily appreciated that although structural differences between the cylindrical integrated housing of multi-laser housing unit 110 and the multi-laser housing unit 610 are illustrated in FIG. 7, that the general function (e.g., in terms of laser wavelength specifications and manner of selecting a particular laser) of both are similar within the context of embodiments of the present invention.

The multi-heating combination print head 602 may include an integrated fan 704 for cooling the extrusion nozzle 606 and/or LIG heater holder 612. The multi-heating combination print head 602 may comprise a mounting plate 706 with one or more mounting openings 708. The inclusion of mounting plate 706 advantageously allows for precise positioning of all elements of multi-heating combination print head 602, as all components are part of a larger unitary structure that more directly mounts to a rail, thereby increasing the precision of individual components and decreasing the tolerances for a 3D printed food product. Similar to the printing platform 108, the illustrated printing platform 608 includes a Joule heater for heating extruded food.

Figure 8:
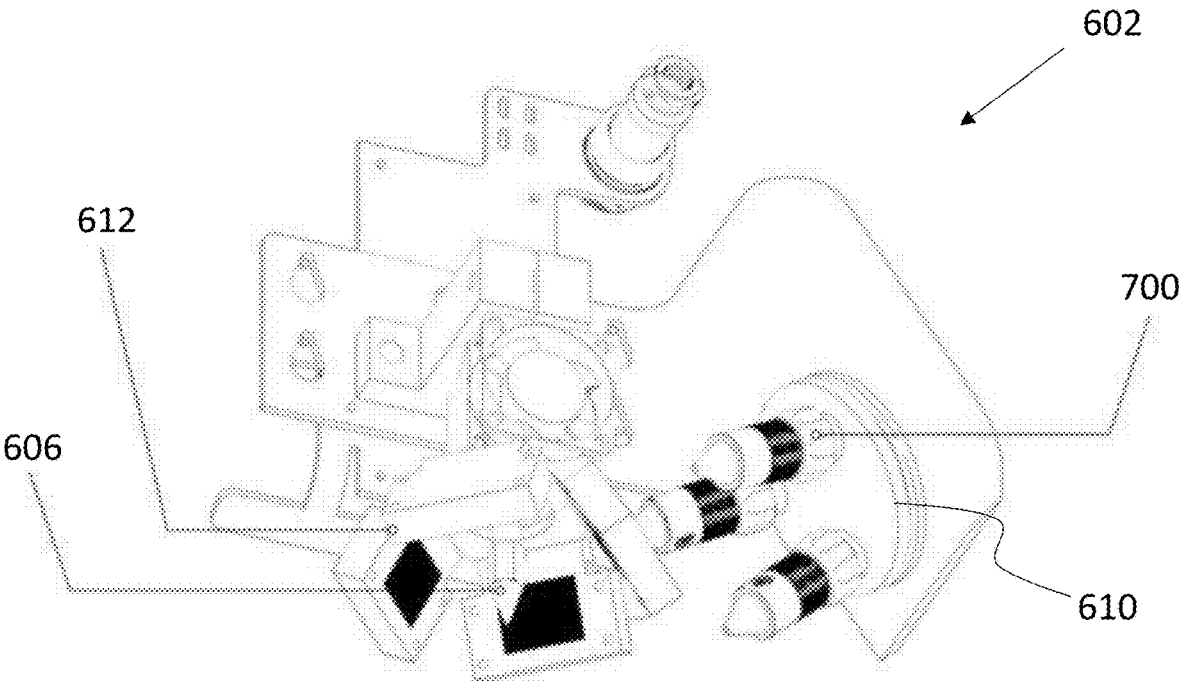
FIG. 8 illustrates a perspective view of the multi-heating combination print head of FIG. 6.

FIG. 8 illustrates an additional perspective view of the multi-heating combination print head 602 of FIG. 6. As illustrated, the multi-laser housing unit 610 may form a unitary structure with other parts of multi-heating combination print head 602 to ensure more precise aiming of laser beams emitted from individual lasers 700. The individual laser beam 700 may be angled relative to an axis of rotation of the multi-laser housing unit 610, which may be configured to rotate such that a laser beam is emitted only when an individual laser 700 is rotated to a particular position. The multi-laser housing unit 610 of FIG. 8 advantageously allows for a laser beam to be emitted toward an extruded food with a greater angle of attack relative to the extrusion direction. This may enable the laser beam to reach spots on an extruded food layer that would otherwise be more difficult to access with an angle of attack closer to coincidence with the extrusion direction.

Figure 9:
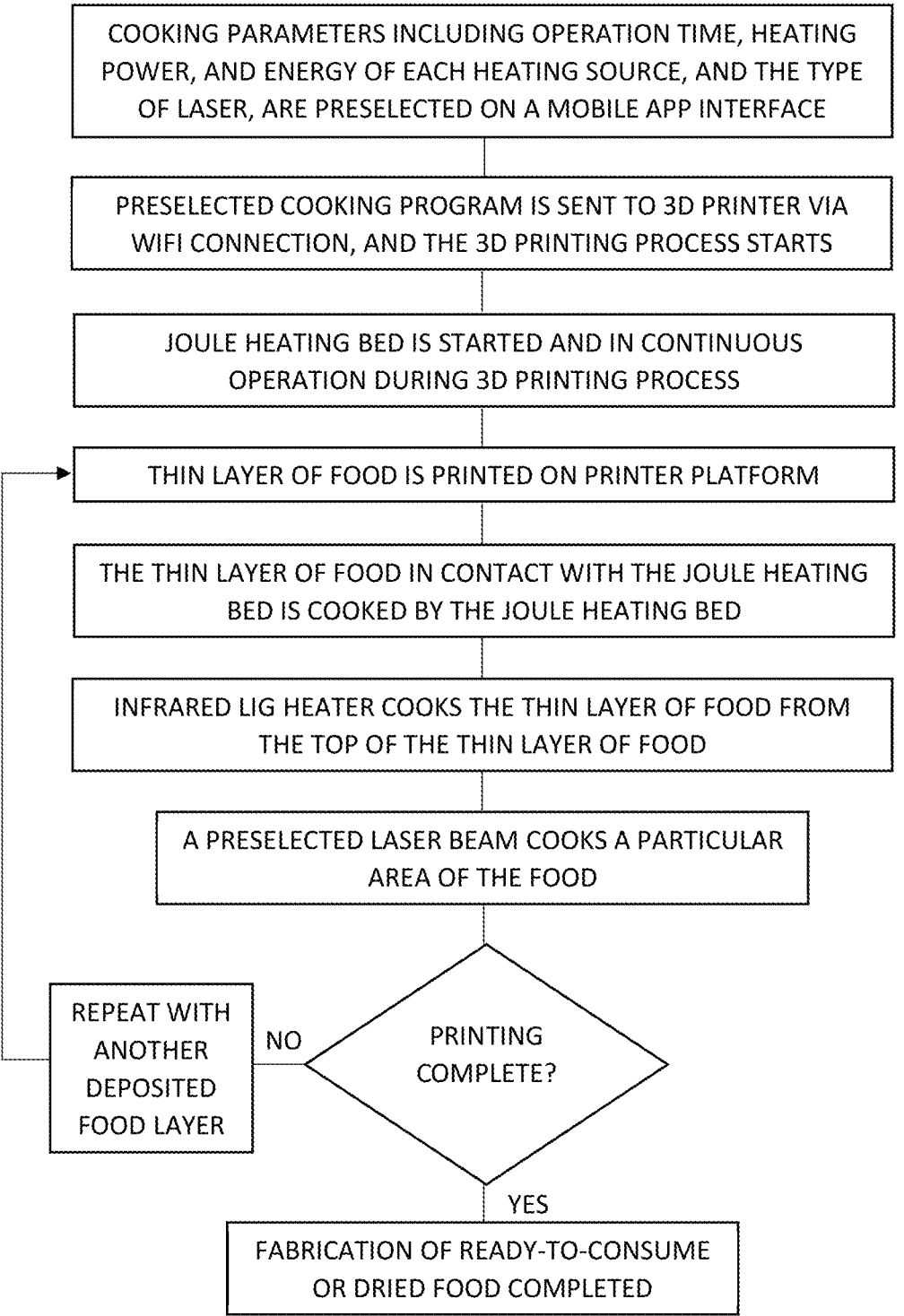
FIG. 9 illustrates a flow chart of a multi-heating combination method.

FIG. 9 illustrates a flow chart of a multi-heating combination method. In the first step of the illustrated method, cooking parameters, including operation time, heating power, the energy of each heating source, and a type of laser are pre-selected via a mobile application interface. The pre-selected parameters and a cooking program are then sent to a 3D food printer via a wireless connection, and the 3D food printing process is started. The Joule heater in the printing platform or heating bed is then powered on and remains in continuous operation during the 3D food printing process. A thin layer of food is printed onto the printer platform. The thin layer of food extruded onto the printer platform is cooked due to the heat provided by the Joule heater. The LIG heater then cooks the thin layer of food that was printed from above. A laser beam based on the pre-selected laser type is emitted to cook a certain area of the printed food. This process is repeated continuously throughout the printing process while an extrusion layer is being formed and for each layer of the 3D printed food until a ready-to-consume food or dried food is fully fabricated.

In some embodiments, a user may make more generic selections using the mobile application interface, and a pre-selected cooking program may be set using more specific cooking parameters associated with the generic selections. For example, rather than selecting an operation time, heating power, or a type of laser for use in a cooking program, a user may simply select a desired food texture. One or more cooking parameters associated with cooking programs having similar food texture outcomes may then be determined and sent to the 3D printer. In some embodiments, cooking programs may be determined based on historical cooking programs that have been stored in a database. In some embodiments, artificial intelligence may be used to predict a cooking program for a user based on the user's past cooking parameter preferences, or based on aggregated data of cooking programs and associated cooking parameters that are stored in a database.

Figure 10:
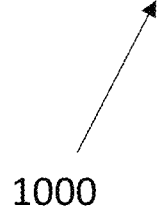
FIG. 10 illustrates a block diagram of a system according to an embodiment of the present disclosure.

FIG. 10 illustrates a block diagram of a 3D food printing system 1000 according to an embodiment of the present disclosure. The system 1000 includes a controller 1002 configured to electronically communicate with and control a plurality of actuators 1004 for moving a printing head unit 1003 within at least two dimensions and, in some embodiments, for moving a printing platform in a third dimension. The controller 1002 is also configured to electronically communicate with and control an extrusion nozzle 1006, a Joule heater 1008, a multi-laser system 1010, an LIG heater 1012, and one or more microfluidic channels 1020. The controller may send and receive data via a wireless communication unit 1014 configured to wirelessly transmit data according to known wireless communication methods. The wireless communication unit 1014 is configured to communicate wirelessly either directly or indirectly via one or more intermediate communication devices (such as servers if the wireless communication is configured to occur via the internet) with an externally located wireless communication unit 1016. The externally located wireless communication unit 1016 is configured to communicate electronically with a mobile application interface 1018, such as a mobile application interface on a smartphone. The system 1000, therefore, provides means for a user to input cooking parameters or printing preferences in a mobile application interface 1018. The cooking parameters and/or printing preferences can then be wirelessly transmitted to the controller, which operates the actuators 1004, Joule heater 1008, extrusion nozzle 1006, multi-laser system 1010, and/or LIG heater 1012 based on the received cooking parameters and/or printing preferences and in accordance with embodiments of the invention described herein.

In some embodiments, the controller 1002 and/or the mobile app interface 1018 are in communication with a local memory or a remote database in which cooking programs and associated cooking parameters are stored. Accordingly, the controller 1002 is configured to implement a cooking program using program-specific cooking parameters stored in the base, as well as cooking parameters that deviate from stored parameters but have been customized by a user via the mobile app interface 1018. In some embodiments, the controller 1002 or a remote processor associated with a database may use artificial intelligence to predict cooking parameters for a cooking program to be implemented based on a request made by a user via mobile app interface 1018. For example, if a user requests a cooking program that has not been previously carried out and/or stored in local memory or a database, artificial intelligence may be used to evaluate similarities between the user's requested cooking program and previous cooking program data, thereby creating a new cooking program with predicted cooking parameters. Artificial intelligence may also be used to select the nutrients that should be included in a user's food based on user data, such as health and/or historical preference data. In some embodiments, artificial intelligence is used to predict how nutrients should be distributed within extruded food, and/or how nutrients should be cooked. In some embodiments, artificial intelligence may be used to adjust the cooking parameters of a stored cooking program based on outcome data indicative of whether previous 3D printing processes resulted in a successful print and/or a print that was considered appetizing to users.

It will also be readily appreciated that individual heating devices and methods described herein may be utilized simultaneously or separately. For example, while all heating devices and methods may be used simultaneously for a uniform and rapid cooking process, in some embodiments, fewer than all of the heating devices and methods may be utilized independently of one another or even independently of whether food is being extruded. Upon completion of a 3D food print, for example, the printing platform may remain heated, and the LIG heaters may remain powered on to complete a cooking process, keep at least part of a completed 3D food print at a desired temperature, or to prevent the completed 3D food print from becoming cold until a user removes the food item from the platform. In some embodiments, a laser beam may be emitted after extrusion is completed to perform a heating operation or a decorative operation. For example, a laser beam may be emitted when extrusion is not occurring to cook a decorative pattern or text onto the surface of a printed food.

In some embodiments, other types of heaters may be utilized in addition to or in place of the heaters described above. For example, a heat gun may be mounted on the 3D printer's structure or on the multi-heating combination print head to supplement previously described heaters and blow hot air directly onto extruded food. In some embodiments, the heat gun is driven by one or more motors to adjust its arrangement within the 3D printer, thereby enabling the heat gun to be positioned based on a variety of cooking parameters and/or preferences and further customize a 3D food printing and cooking process. In some embodiments, the heat gun is mounted to the multi-heating combination print head and is thus integrated more simply with other heating elements, thereby reducing the cost and complexity of an overall 3D printer. In such an embodiment, parameters of the heat gun, such as heating temperature and air velocity, may be changed to customize a cooking process to the needs and/or preferences of a user without requiring a change in the heat gun's position or orientation.

Figure 11:
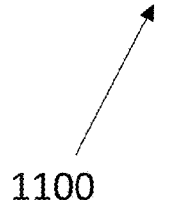
FIG. 11 illustrates a perspective view of an integrated cone heater mount according to an embodiment of the present disclosure.

FIG. 11 illustrates a perspective view of an integrated cone heater mount 1100 according to an embodiment of the present disclosure. The integrated cone heater mount 1100 includes a printing nozzle 1102 with a cone-shaped graphene heater 1104. The integrated cone heater mount 1100 also includes a print platform calibration sensor 1106, a step motor 1108, an adaptor mount, an extended laser mount 1112, and a fixed laser cooking unit 1114 with a Galvanometer (Galvo) to control laser cooking parameters and patterns. The cone-shaped graphene heater 1104 is configured for even distribution of heat directed toward the outlet of the printing nozzle 1102, flaring outward as it extends toward the outlet of the printing nozzle 1102. The calibration sensor 1106 is configured to ensure that a printing platform and the printing nozzle 1102 remain level relative to one another, thereby ensuring an even and high-quality print. The step motor 1108 is configured to control the extrusion flow rate of food through the printing nozzle 1102. The adaptor mount 1110 provides a structural framework by which components of the integrated cone heater mount may be rigidly secured. The extended laser mount 1112 provides a structural extension to allow the fixed laser cooking unit 1114 to maintain a proper distance from food extruded from printing nozzle 1102. The fixed laser cooking unit 1114 provides for Galvo-based control of a cooking laser, thereby reflecting laser light via mirrors as necessary for a highly customizable cooking process. Advantageously, the Galvo-based control of the cooking laser in fixed laser cooking unit 1114 allows for laser cooking control that is less dependent on the precise location of the printing nozzle 1102. The integrated cone heater mount 1100 is configured to mount to an x-y axis of a 3D food printer, thereby facilitating the integration of the integrated cone heater mount 1100 and cooking methods according to embodiments of the present disclosure with existing 3D food printers. In some embodiments, integrated cone heater mount 1100 may exclude the extended laser mount 1112 to provide a simpler structure that is easier to mount to an existing printer axis and to simplify cooking controls. The fixed laser cooking unit 1114 may be separately mounted to a structural framework of a 3D printer instead of an axis.

Figure 12:
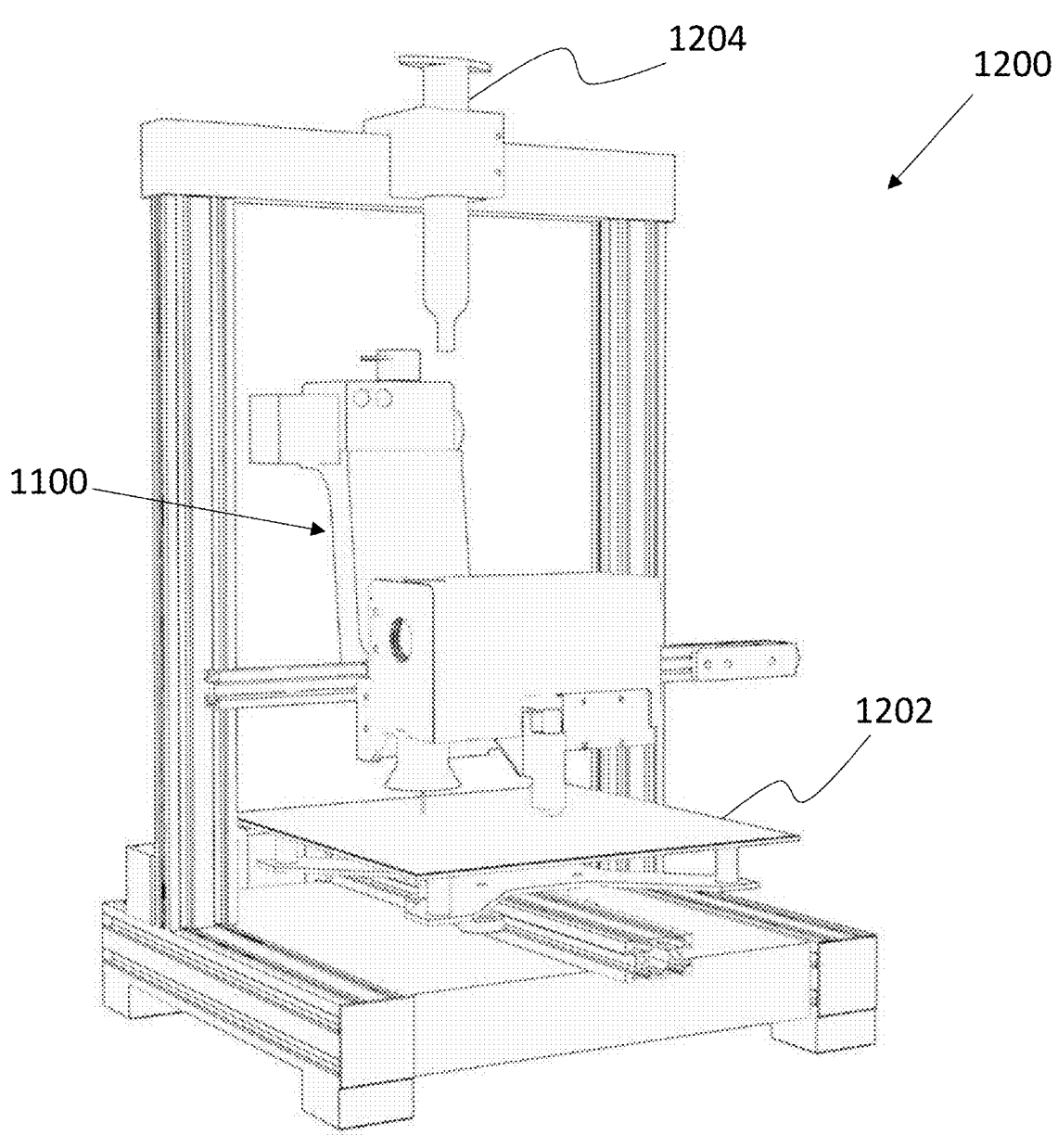
FIG. 12 illustrates a perspective view of a 3D food printer according to an embodiment with an integrated cone heater mount and a printing platform.

FIG. 12 illustrates a perspective view of a 3D food printer 1200 according to an embodiment with an integrated cone heater mount 1100 and a printing platform 1202. The 3D food printer 1200 includes an extrusion syringe 1204 arranged above the integrated cone heater mount 1100 and printing platform 1202. The extrusion syringe 1204 is configured to be filled with food items in the form of a paste that can be extruded by an air-pressure-driven system, a plunger-based system, or a screw-driven system, thereby pushing the food paste out for deposition onto the printing platform 1202. The extrusion syringe 1204 may provide food paste that is used by the integrated cone heater mount 1100 for extrusion through printing nozzle 1102, or may provide a separate extrusion process directly onto the printing platform 1202 or a food already printed onto the printing platform 1202.

Figure 13:
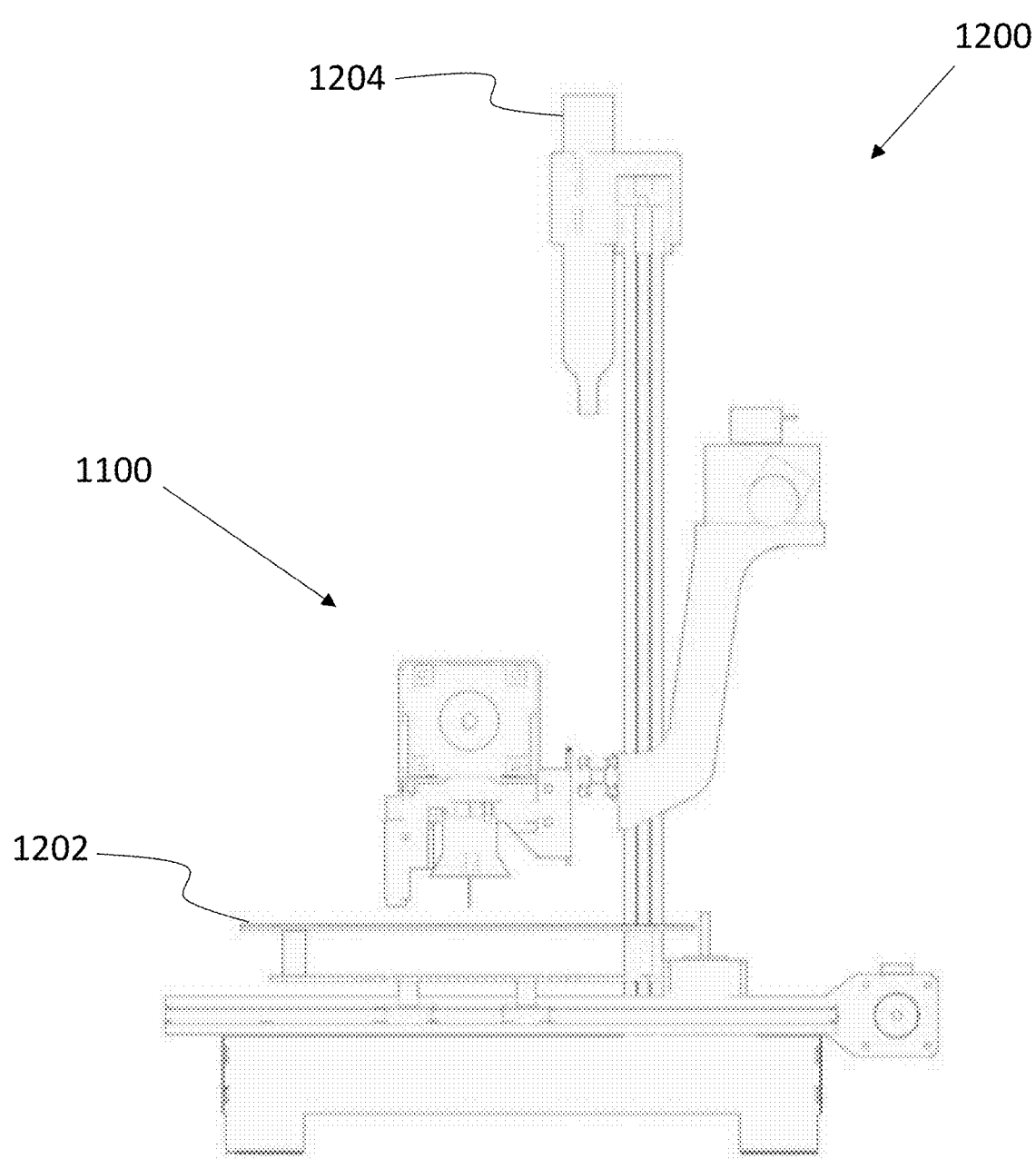
FIG. 13 illustrates a side view of the 3D food printer of FIG. 12.

FIG. 13 illustrates a side view of the 3D food printer 1200 of FIG. 12.

Figure 14:
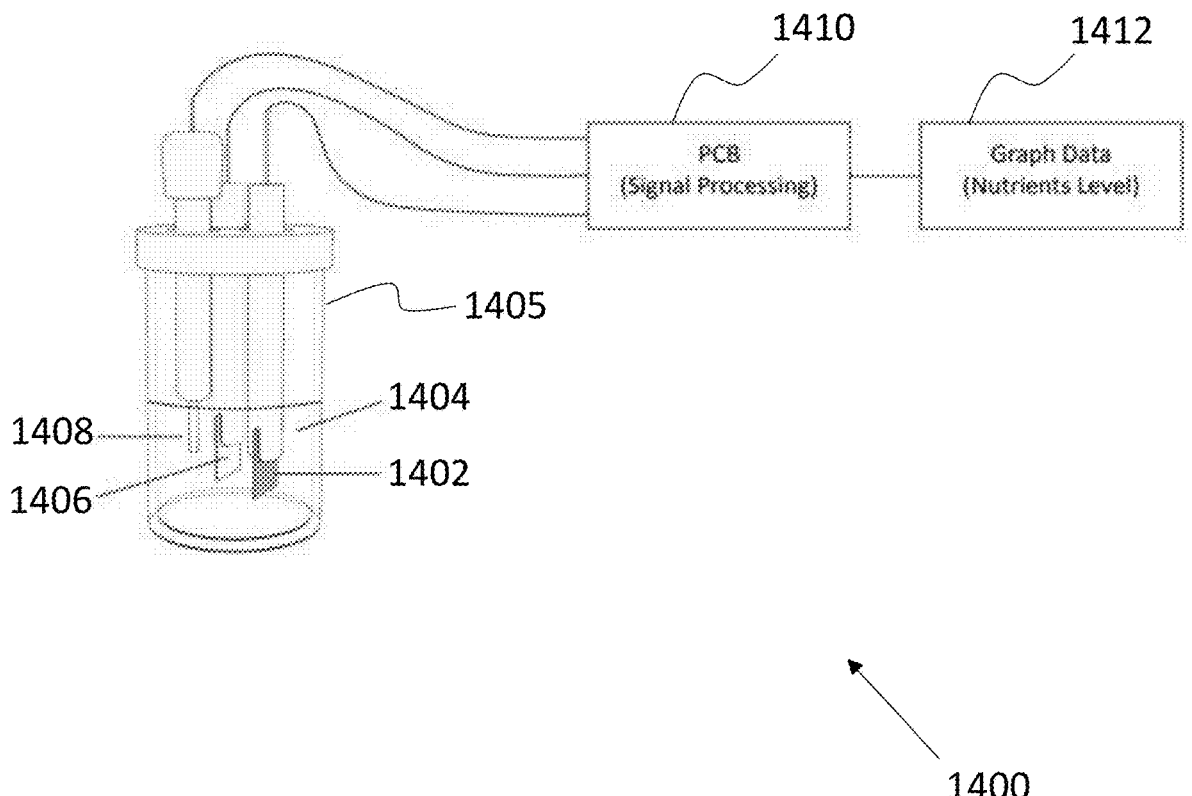
FIG. 14 illustrates a food testing device according to an embodiment of the present disclosure.

FIG. 14 illustrates a food testing device 1400 according to an embodiment of the present disclosure. The food testing device 1400 includes a working electrode 1402 that is configured to be submerged in an electrolyte solution 1404 held in a testing receptacle 1405. The electrolyte solution 1404 includes a food sample that is to be evaluated. The food testing device also includes a counter electrode 1406 and a reference electrode 1408 configured to be submerged in the electrolyte solution 1404. The electrodes 1402, 1406, 1408 are configured to measure an electrical potential through the electrolyte solution 1404. A printed circuit board (PCB) 1410 is provided for processing signals received from electrodes 1402, 1406, 1408 and for providing electrical potential to one or more electrodes 1402, 1406, 1408. Processed signals are then transmitted as graph data 1412, which provides nutrient levels of one or more nutrient types detected in the electrolyte solution 1404 based on signal processing carried out by the PCB 1410.

In some embodiments, the food testing device 1400 may be provided as a stand-alone portable unit, thereby enabling convenient food testing in a variety of environments. In some embodiments, the food testing device 1400 is integrated into a food printer. For example, the frame of a food printer may be configured to include a testing receptacle 1405 with an open top, thereby allowing a printing head to extrude food into the electrolyte solution 1404 for testing. The electrodes 1402, 1406, 1408 could then be lowered, either individually or together, into the electrolyte solution to perform measurements. In such an embodiment, the PCB 1410 may be a stand-alone PCB configured for dedicated signal processing of signals from the electrodes 1402, 1406, 1408, or may be a shared PCB that is configured to also perform some functions of the printer. An advantage of an integrated food testing device 1400 is that quality control of printed foods may be carried out close in real-time or near real-time. Furthermore, the operational status of the printer may be checked prior to performing a printing operation. For example, a pre-defined or scheduled food item or recipe may be extruded into the food testing device 1400 prior to initiation of a food printing operation on a printer bed, thereby allowing for a quality control check of nutrient calibration check prior to beginning a printing process. This advantageously reduces the likelihood of an erroneous print being carried out, especially when an erroneous print may include nutrient imbalances that are difficult to perceive or detect until the completion of an entire food printing process. Furthermore, the foregoing integrated embodiment eliminates the need for destructively testing printed foods. The food testing device 1400 may be configured for single-use testing or configured for multiple tests as the electrolyte solution 1404 is changed due to the addition of food samples. In some embodiments, the electrolyte solution 1404 may be added or removed to the testing receptacle 1405 via one or more hoses and/or pumps, thereby allowing the electrolyte solution to be replenished with an untainted solution prior to or in between tests.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A 3D food printer comprising:
a printer head including an extrusion nozzle, an infrared heater, and a laser assembly with at least one laser; and
a heated printing platform,
wherein the extrusion nozzle is configured to extrude food onto the printing platform,
wherein each of the printing platform, the infrared heater, and the at least one laser are configured to heat food extruded onto the printing platform, and
wherein the infrared heater includes a laser-induced graphene heater.

2. The 3D food printer of claim 1, wherein the infrared heater includes a plurality of laser-induced graphene heaters.

3. The 3D food printer of claim 2, wherein the plurality of laser-induced graphene heaters are arranged evenly distributed above the extrusion nozzle in a fixed position relative to the extrusion nozzle and at an angle relative to the printing platform.

4. The 3D food printer of claim 2, wherein the laser-induced graphene heaters are configured to evenly heat an upper surface of food extruded onto the printing platform.

5. The 3D food printer of claim 1, further comprising a controller in communication with a wireless receiver,
wherein the controller is configured to control a heating operation of each of the extrusion nozzle, the laser assembly, the infrared heater, and the printing platform based on instructions received by the wireless receiver.

6. The 3D food printer of claim 1, wherein the controller is configured to receive cooking parameters including a food textural property and a nutrition property, and
wherein the controller is configured to control a heating operation of each of the extrusion nozzle, the laser assembly, the infrared heater, and the printing platform based on the received cooking parameters.

7. The 3D food printer of claim 1, wherein the controller is configured to receive a food type, and
wherein the controller is configured to control a heating operation of each of the extrusion nozzle, the laser assembly, the infrared heater, and the printing platform based on the received food type.

8. The 3D food printer of claim 1, wherein each of the printing platform, the at least one laser, and the infrared heater are configured to heat food extruded onto the printing platform and the extrusion nozzle is configured to extrude food simultaneously with heating of the food extruded onto the printing platform.

9. The 3D food printer of claim 1, wherein the printing platform includes a Joule heater configured to heat the food extruded onto the printing platform by the extrusion nozzle until a 3D food printing process is completed.

10. The 3D food printer of claim 9, wherein the Joule heater is configured to reach a temperature of at least 140 degrees Celsius within 90 seconds of receiving power.

11. The 3D food printer of claim 1, wherein the laser assembly includes three lasers including an infrared laser, a 405 nm laser, and a 450 nm laser, and wherein one of the three lasers may be selectively powered on at any given time to heat food extruded onto the printing platform.

12. A method for 3D printing food, comprising:

extruding food onto a printing platform via an extrusion nozzle; and simultaneously heating food extruded onto the printing platform with:

a Joule heater embedded in the printing platform, at least one laser included in a laser assembly, and an infrared heater including a laser-induced graphene heater.

13. The method of claim 12, further comprising moving the extrusion nozzle to deposit a plurality of food layers onto the printing platform, the laser assembly and the infrared heater being configured to move together with the extrusion nozzle.

14. The method of claim 12, further comprising:

receiving one or more of cooking parameters and a food type, the cooking parameters including a food textural property and a nutrition property; and controlling a heating operation of the laser assembly and the infrared heater to cook food extruded onto the printing platform based on the received cooking parameters and/or food type.

15. The method of claim 14, further comprising generating a recipe using artificial intelligence based on the received cooking parameters and/or one or more answers provided by a user to one or more questions; and determining a dosage of nutrients to be extruded in each layer of a 3D printed food.

16. The method of claim 14, wherein controlling the heating operation of the laser assembly includes actuating and/or selectively powering one of a plurality of lasers depending on the received cooking parameters.

17. The method of claim 12, wherein the laser assembly includes an infrared laser, a 405 nm laser, and a 450 nm laser.

18. The method of claim 12, wherein the infrared heater includes a plurality of laser-induced graphene heaters.

\* \* \* \* \*